Patented June 30, 1953

2,644,007

UNITED STATES PATENT OFFICE 2,644,007

PREPARATION OF POLYAMINE HYDRO-
CHLORIDES AND POLYISOCYANATES

Carl F. Irwin, New Castle, Del., assignor to E. I.
du Pont de Nemours and Company, Wilmington, Del., a corporation of Delaware No Drawing. Application October 8, 1951,
Serial No. 250,380

6 Claims. (Cl. 260—453)

This invention relates to the preparation of organic polyisocyanates from the corresponding primary polyamines, and particularly to a step in the process during which hydrochlorides of the amines are formed.

It is well known in the art to prepare isocyanates from amines by reacting them, either in the free state or in the form of their salts such as the hydrochlorides, with phosgene. The overall reaction taking place may be represented as:

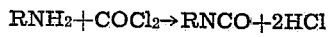
RNH$_2$+COCl$_2$→RNCO+2HCl in which R is an organic radical. The reaction does not however proceed as straightforwardly as this representation might indicate, since unless precautions are taken, the isocyanate which is formed may react with some of the starting amine to form a substituted urea, by a reaction such as:

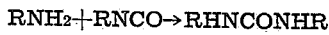
RNH$_2$+RNCO→RHNCONHR

To avoid this, various schemes have been proposed. One commonly used process is to carry out the reaction in two steps, the first step being performed in the cold, at 0° C. up to about room temperature, with the formation of a carbamyl chloride and the evolution of hydrogen chloride which tends to react wtih any free amino groups and to protect them from side reactions. The mixture is then heated to convert the carbamyl chloride to the desired isocyanate. These two steps may be represented as:

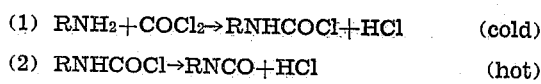
(1) RNH$_2$+COCl$_2$→RNHCOCl+HCl (cold)

(2) RNHCOCl→RNCO+HCl (hot)

This two-step process has the disadvantage of being slow and of requiring careful control of temperatures to avoid side reactions.

Another known method of avoiding side reactions involving the amine is to react it first in the cold with HCl, usually as gaseous hydrogen chloride, to form the amine hydrochloride, and thereafter to react the hydrochloride with phosgene in the presence of a solvent. The hydrochloride as ordinarily prepared is in the form of a thick mass of crystals which are difficult to agitate unless large amounts of solvent are employed. This requires the use of equipment having large capacity. Unless excessively large amounts of solvent are used, the mass of crystals is so thick that reaction with the phosgene proceeds at an undesirably slow rate.

It has also been proposed to carry out the reaction between an amine and phosgene in the vapor phase. Although this process is apparently operable with simple amines, it has not been found practical for diamines and other polyamines, which have greater reactivity and tendency toward the formation of undesired by-products than have the monoamines.

It is an object of this invention to provide a process by which low viscosity suspensions of polyamine hydrochlorides may be formed. A further object is to provide an improved process for the preparation of organic isocyanates in which shorter reaction times and greater production in given equipment may be secured. Further objects will appear from the description of this invention which follows.

I have found that low viscosity suspensions of polyamine hydrochlorides may be prepared by introducing at least an equivalent amount of gaseous hydrogen chloride into a vigorously agitated solution of an organic primary polyamine in an organic solvent, at a temperature between 120 and 150° C. and below the boiling point of the solution. The resulting polyamine hydrochloride may be converted directly to the corresponding isocyanate by introducing phosgene into the suspension at a temperature between 120 and 200° C. and below the boiling point of the solution, until hydrogen chloride is no longer evolved.

If the temperature of hydrochlorination is raised above 150° C., the reaction mass becomes very difficult to stir. The already formed hydrochloride tends to aggregate into lumps and may form a solid mass which is completely non-stirrable. On the other hand if the temperature falls below about 120° C. the slurry of hydrochloride thickens very markedly and the agitator merely moves through the mass without stirring it. In order to make the mass stirrable at these lower temperatures it is necessary to add two to three or four times as much solvent for the same amount of amine hydrochloride. This, of course, drastically lowers the yield of isocyanate in a given piece of equipment.

The process is illustrated by the following examples:

Example 1

Sixty-two (62) parts of 2,4-tolylene diamine are dissolved in 490 parts of o-dichlorobenzene and gaseous hydrogen chloride is passed in under the surface while agitating vigorously. The addition is at a rate of 25–30 parts of HCl per hour. The temperature is originally about 120° C. but rises quickly to about 130° C., and is maintained at that temperature during the addition, which requires about 2 hours. The dihydrochloride of 2,4-tolylene diamine is formed as finely divided crystals. The mass is easily stirrable. Phosgene is then passed into the slurry while the vigorous agitation is continued. The temperature is gradually increased to about 160–175° C. until the evolution of HCl ceases. The phosgenation requires 4 hours. The o-dichlorobenzene is then distilled off. The crude 2,4-tolylene diisocyanate is analyzed and shows a yield of 91% based on the starting amine.

Similar results are obtained if instead of o-dichlorobenzene, xylene or monochlorobenzene is used as the solvent.

Hexamethylene diamine may be substituted for the 2,4-tolylene diamine with the same advantage of easy stirrability.

Example 2

A solution containing 62.7 parts of methylene bis(4-phenylamine) in 493 parts of o-dichlorobenzene is prepared and dry hydrogen chloride is passed into the solution with vigorous agitation at 120–135° C. until all the amine has reacted to form the dihydrochloride. A readily stirrable slurry of fine crystals results. Phosgene is then passed into the slurry while the agitation is continued and the temperature is maintained in the range of 150–177° C. The phosgenation is complete in 3 hours. The solvent is distilled off under vacuum and 63 parts of crude methylene bis(4-phenyl isocyanate) are obtained. Based on analysis for purity the yield is 85%.

In place of the particular polyamines described in the examples any other organic primary amine which will not decompose under the conditions of reaction may be employed. The amine may be aliphatic, aromatic, or cycloaliphatic and may contain substituent groups such as nitro, alkoxy, halogen, or ester groups which do not react with isocyanates. It may also contain hetero atoms such as nitrogen, sulfur and oxygen, interrupting the carbon skeleton. The aliphatic amines may be saturated or unsaturated, straight or branch chained. The aromatic and cycloaliphatic amines may be ring substituted. This invention is particularly concerned with diamines but is also applicable to primary triamines and higher polyamines. In addition to the compounds described in the examples, other representative compounds include tetramethylene diamine, octamethylene diamine, p-phenylene diamine, the naphthylene diamines, benzidine, 4-chloro-1,3-phenylene diamine, 2-chloro-1,4-phenylene diamine, 2-methoxy-1,4-phenylene diamine, 2-nitro-1,4-phenylene diamine, o-tolidine, o-dianisidine and triaminobenzene.

Any organic solvent for the polyamine which has a boiling point above 120° C. and which is inert with respect to the reactants and the products of reaction may be used instead of o-dichlorobenzene. Various aromatic hydrocarbons such as ethylbenzene, n-butylbenzene, n-dodecylbenzene, naphthalene, diphenyl, and xylene; aliphatic and alicyclic hydrocarbons such as kerosene and o-dimethylcyclohexane; halogenated hydrocarbons such as 1,4-dichlorobutane, 1,5-dichloropentane, 1,2-dichloronaphthalene, alpha-chloronaphthalene, o-chlorodiphenyl and o-bromotoluene; and compounds containing hetero atoms, such as cyclohexanone and nitrobenzene may be used.

The term "low viscosity suspension" as used in this specification and the appended claims is obviously employed in a relative sense, since the actual viscosity of the suspension of the amine hydrochloride will vary depending upon the concentration and on the nature of the solvent and of the particular amine used. In each case however the viscosity of the suspension will be substantially lower than that of otherwise similar suspensions prepared according to the processes of the prior art.

By the use of the novel procedure described herein the usual time of phosgenation is cut in half. It is also possible to double or triple the amount of diisocyanate which may be prepared at a time in any specific unit of equipment, because of the considerably reduced quantity of solvent required to give a stirrable suspension. It is also possible to use larger reaction vessels than heretofore, because of the lower viscosity of the slurry, and the greater ease with which it may be agitated.

The organic diisocyanates prepared by this process have many uses well known in the art. They are useful in the formation of adhesive bonds when compounded with elastomeric substances. Such adhesives may be used for adhering reinforcing cords to the rubber carcass in the manufacture of tires. Diisocyanates are also useful as cross linking agents in the preparation of plastics from compounds containing active hydrogen atoms such as are present in the hydroxyl, amino and carboxyl radicals.

I claim:

1. A process for preparing an organic polyisocyanate which comprises introducing at least an equivalent amount of gaseous hydrogen chloride into a vigorously agitated solution of an organic primary polyamine in an inert organic solvent having a boiling point above 120° C., this solution being maintained at a temperature between 120 and 150° C. and below the boiling point of the solution, to form a low viscosity suspension of the corresponding polyamine hydrochloride, introducing phosgene into the suspension at a temperature between 120 and 200° C. and below the boiling point of the solution until hydrogen chloride is no longer evolved, and thereafter separating the polyisocyanate from the solvent.

2. In a process of preparing an organic polyisocyanate by first reacting a primary polyamine with hydrogen chloride to form a polyamine hydrochloride and thereafter reacting with phosgene to form the polyisocyanate, the improvement which comprises preparing the polyamine hydrochloride in the form of a low viscosity suspension by introducing at least an equivalent amount of gaseous hydrogen chloride into a vigorously agitated solution of the polyamine in an inert organic solvent having a boiling point above 120° C., while maintaining the solution at a temperature between 120 and 150° C. and below the boiling point of the solution.

3. A process of preparing a low viscosity suspension of an organic polyamine hydrochloride in an inert organic solvent having a boiling point above 120° C. which comprises introducing at least an equivalent amount of gaseous hydrogen chloride into a vigorously agitated solution of an organic primary polyamine in the organic solvent at a temperature between 120 and 150° C. and below the boiling point of the solution.

4. A process according to claim 3 in which the organic primary polyamine is a diamine.

5. A process according to claim 4 in which each amino group of the organic primary diamine is attached to an aromatic nucleus.

6. A process of preparing a low viscosity suspension of 2,4-tolylene diamine hydrochloride which comprises introducing at least an equivalent amount of anhydrous hydrogen chloride into a vigorously agitated solution of 2,4-tolylene diamine in o-dichlorobenzene at a temperature between 120 and 150° C.

CARL F. IRWIN.

References Cited in the file of this patent

UNITED STATES PATENTS

| Number | Name | Date |
|---|---|---|
| 2,326,501 | Siefken et al. | Aug. 10, 1943 |
| 2,374,340 | Farlow | Apr. 24, 1945 |
| 2,379,948 | Burgoine et al. | July 10, 1945 |